United States Patent [19]
Kosmatka

[11] Patent Number: 4,704,661
[45] Date of Patent: Nov. 3, 1987

[54] FACETED REFLECTOR FOR HEADLAMPS

[75] Inventor: Walter J. Kosmatka, South Euclid, Ohio

[73] Assignee: General Electric Company, Schenectady, N.Y.

[21] Appl. No.: 900,195

[22] Filed: Aug. 25, 1986

[51] Int. Cl.⁴ ................................................ B60Q 1/00
[52] U.S. Cl. ...................................... 362/61; 362/310; 362/346
[58] Field of Search ................. 362/61, 297, 299, 300, 362/346, 348, 350, 304, 215, 347, 298

[56] References Cited

U.S. PATENT DOCUMENTS 3,700,883 10/1972 Donohue ............................ 362/310
4,351,018 9/1982 Fratty ................................. 362/310

FOREIGN PATENT DOCUMENTS 2843965 4/1980 Fed. Rep. of Germany ...... 362/346

*Primary Examiner*—James C. Yeung
*Attorney, Agent, or Firm*—John P. McMahon; Philip L. Schlamp; Fred Jacob

[57] ABSTRACT

A multi-faceted reflector for a headlamp of a motor vehicle is disclosed. The motor vehicle headlamp has the desired optics, in the form of facets, placed entirely on the reflective surfaces of the reflector. The reflective surfaces are comprised of a plurality of discrete reflective surfaces having right (i.e., surfaces of a parabolic shape in the vertical plane and being linear or cylindrical in the horizontal plane) parabolical cylindrical surfaces and discrete simple rotated parabolical surfaces. All of the reflective surfaces are located relative to the light source of the headlamp. The parabolic cylindrical surfaces, serving as spreading facets create a lateral spread of the light developed by the light source of the lamp, whereas, the simple rotated parabolic surfaces, serving as bending facets, create a shifting, relative to the light source, of the projected image of the light source. The shifted light forms the compact high intensity portion of the light output of the headlamp which cooperates with the lateral spread light to form a compact light output which serves the illumination needs of the motor vehicle.

16 Claims, 12 Drawing Figures

Fig. 3(a)
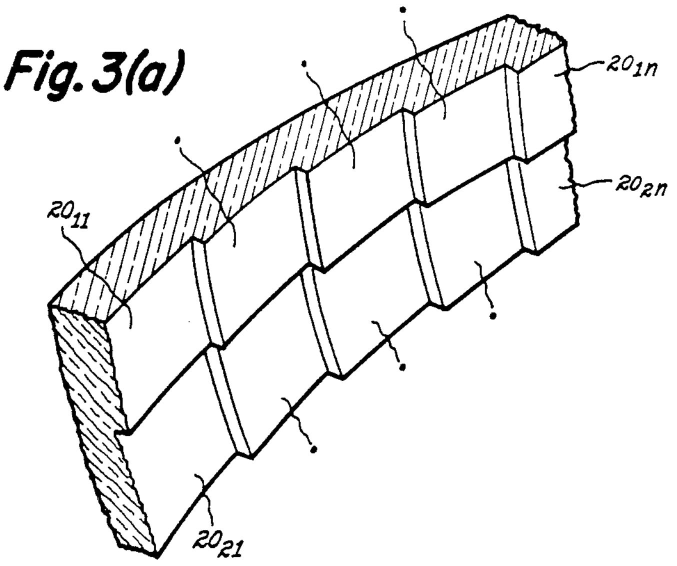
Fig. 3(b)
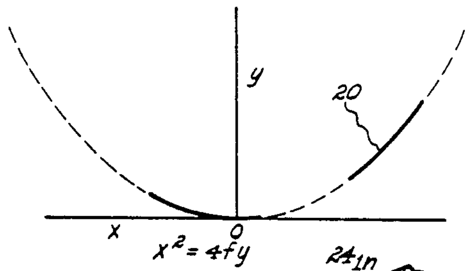
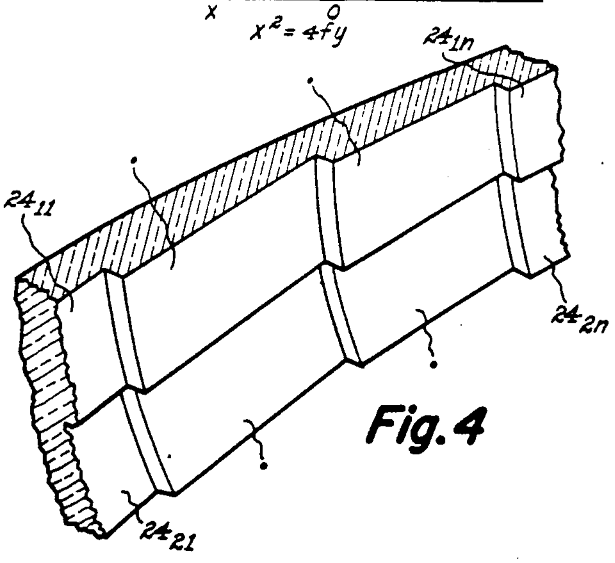
Fig. 4

FACETED REFLECTOR FOR HEADLAMPS

BACKGROUND OF THE INVENTION

The present invention relates to reflectors and, in particular, to reflectors for headlamps mounted on motor vehicles.

The present invention is primarily related to motor vehicles headlamps utilized to accommodate the aerodynamic styling of automobiles. With conventional approaches, each new aerodynamic or "aero" car model requires specifically designed headlamps; in particular a right and a left headlamp. Each "aero" car body style requires different slope or rake angles and a slightly different peripheral shape. As a result, each motor vehicle headlamp commonly has a lens specifically designed for the particular aero car model of concern. Because of the various different aero car models, various lenses specific to each model need to be provided.

If the light output of the motor vehicle headlamp was developed entirely by the reflector, the lens could be optically passive or neutral and need only be implemented for cosmetic and not optical purposes. Further, such a reflector could be designed so that one reflector could accommodate the optical requirements of a variety of automobile body styles with the lens and bezel systems filling in for slight size differences of mounting and the motor vehicle. Further, if the headlamps placed on the right and left sides of the vehicle could be designed so that a single reflector-source system produced the desired headlamp beam, then further needs of the lens could be eliminated. Such a reflector source system would have peripheral geometry designed so as to fit into proper relationship to the vehicle body and the cavity available in the fender compartments. The aerodynamic shape of the vehicle would be attained by suitably shaped and format lenses for the right and left sides of the vehicle. These lenses and their associated tooling would be much less expensive because there would be no need for the complex optics for lenses required to produce the necessary beam pattern on the roadway.

An additional advantage of eliminating the lens as it is related to the development of the light output of the headlamp, is that one source of light projection inaccuracy would be eliminated. In contemporary lamps having a reflector and lens combination, light source position, reflector accuracy and lens prescription, each disadvantageously contribute against obtaining the desired accuracy of the developed beam and often disadvantageously act in concert. In such an arrangement there are six possible error contributors. By eliminating the lens effect, three disadvantageous contributors are eliminated. More particularly, lens and reflector, lens and source, and lens-reflector-source interactions are obviated by elimination of lens optics.

U.S. Pat. No. 3,700,883 of Donahue and Joseph discloses a cornering lamp for a motor vehicle having an optically passive or neutral lens. This vehicle lamp, while serving its desired purpose as a cornering lamp, has optical parameters such as spherical, parabolic, and right cylindrical surfaces. Cornering lamps employing cylindrical surfaces, by their very nature diffuse the compactness of light projected off of their surfaces. While this is desirable in producing the wide beam desired of a stop/tail lamp related to a cornering lamp, it is contrary to the interest and needs of headlamp beams which are very compact and specific in their light distribution. It is desired that a motor vehicle headlamp develop a compact light distribution and have an optically passive lens so that it may be utilized to serve the needs of the aerodynamic styling of automobiles.

Accordingly, an object of the present invention is to provide a motor vehicle headlamp wherein the optics required to provide the desired illumination of the vehicle are placed entirely on the reflector so as to project a beam outward in a desired compact illumination pattern to serve the highway need of a motor vehicle.

Another object of the present invention is to provide the reflector comprising faceted surfaces which provide a projected beam of predetermined intensity distribution.

Another object of the present invention is to provide the headlamp unit wherein glare is sufficiently reduced by providing selective orientation of the facets of the reflector.

SUMMARY OF THE INVENTION

The present invention is directed to a a motor vehicle headlamp having an optically passive lens and a reflector having the desired optics placed entirely on its reflective surfaces for projecting a light beam in a predetermined illumination pattern.

The reflector comprises a plurality of discrete reflective surfaces located relative to the light source of the headlamp and having right parabolic cylindrical surfaces and simple rotated parabolic surfaces. The right parabolic surfaces create a lateral spread of the light developed by the light source, whereas, the simple rotated parabolic surfaces are rotated about the focal point of a parabola and create a shifting of the light developed by the light source, whereby the right parabolic and simple rotated surfaces cooperate to develop a compact projected light pattern.

The motor vehicle headlamp having its optics placed entirely on the reflector surfaces, further comprises an optically passive lens. The headlamp is adapted to be mounted on a motor vehicle.

BRIEF DESCRIPTIONS OF THE DRAWING

FIG. 1 is a front perspective view of a reflector housing a light source in accordance with the present invention;

FIGS. 2(*a*) and (*b*) illustrate perspective and side views, respectively, of an initial parabolic bending facet of the present invention;

FIGS. 2(*c*) and (*d*) illustrate perspective and side views, respectively, of a final bending facet having a parabolic cylindrical created by translation of a parabolic curve along a straight line;

FIG. 2(*f*) illustrates the angle of rotation of the final bending facet relative to the focal point of the reflector;

FIG. 2(*g*) illustrates the final bending facet relative to the initial parabolic bending facet;

FIG. 3(*a*) is a perspective view of a portion of the bending facets of the present invention;

FIG. 3(*b*) is an illustration of the parabolic curve related to the bending facets of the present invention.

FIG. 4(*a*) is a perspective view of a portion of the spreading facets of the present invention;

DETAILED DESCRIPTION OF THE PREFERRED EMBODIMENTS

Figure 1:
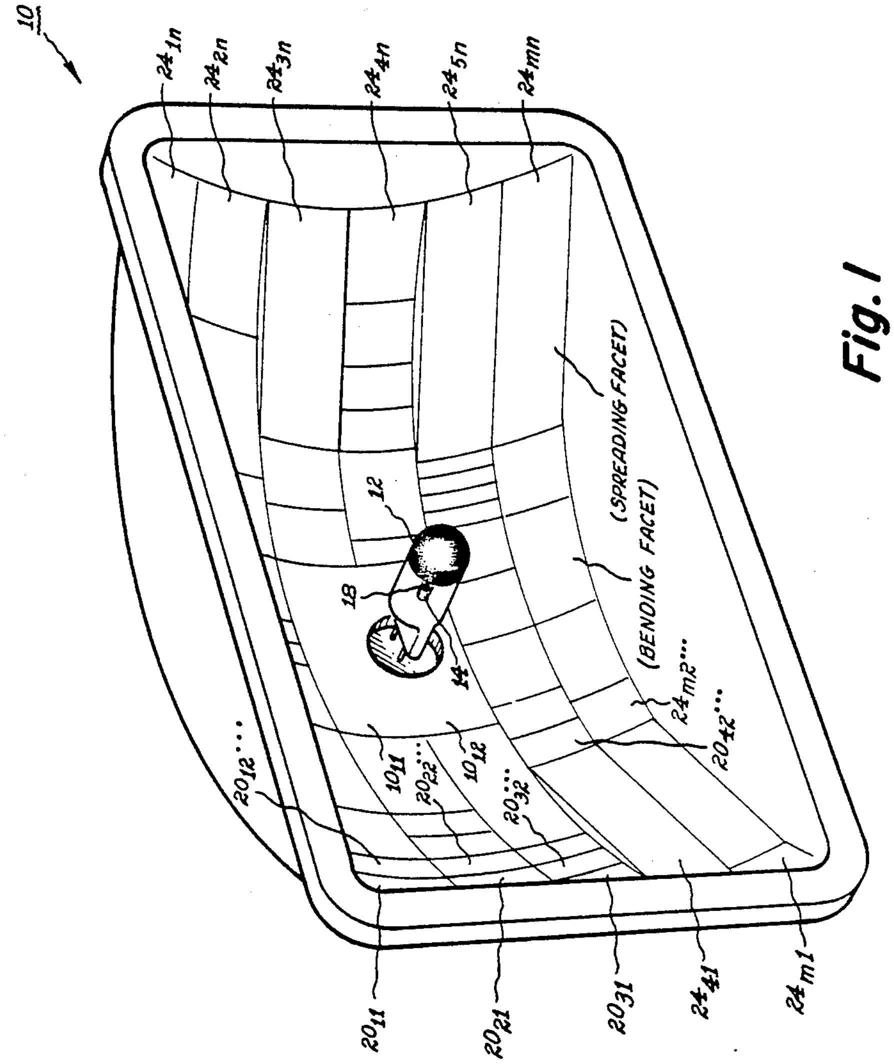
Figure 2A:
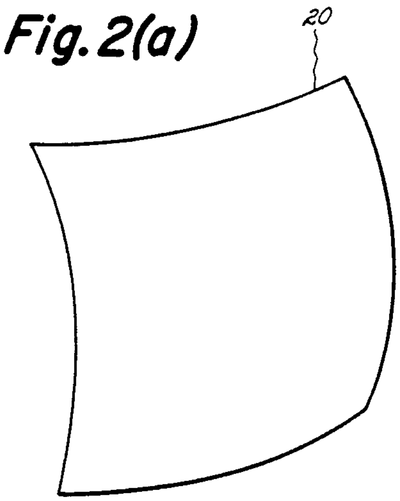
FIG. 2(*e*) illustrates the relationship between the initial parabolic bending facet and the focal point of the reflector.
Figure 2B:
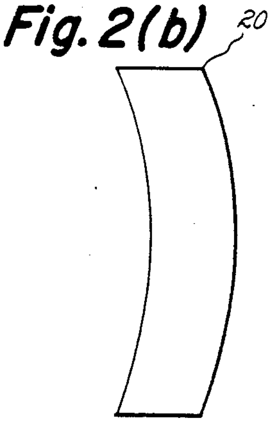
Figure 2C:
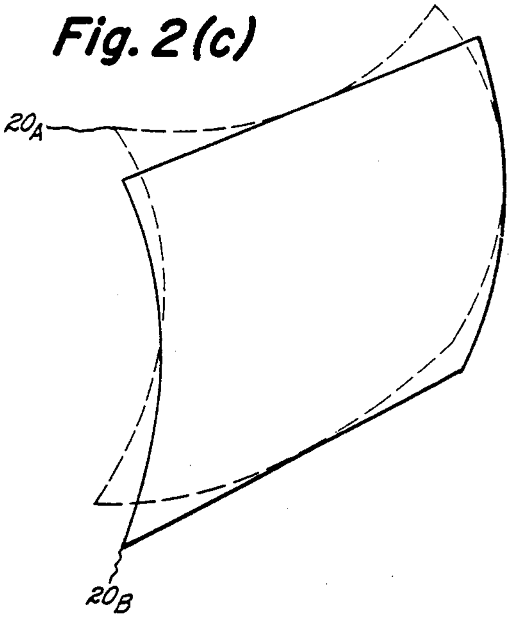
Figure 2D:
Figure 2G:
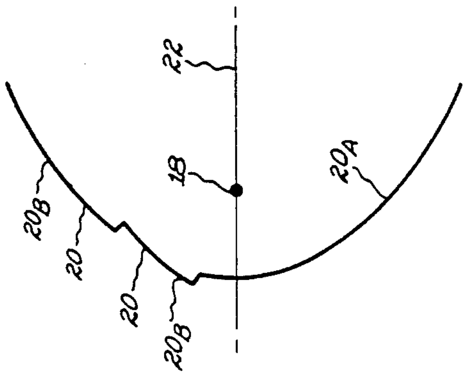
Figure 2E:
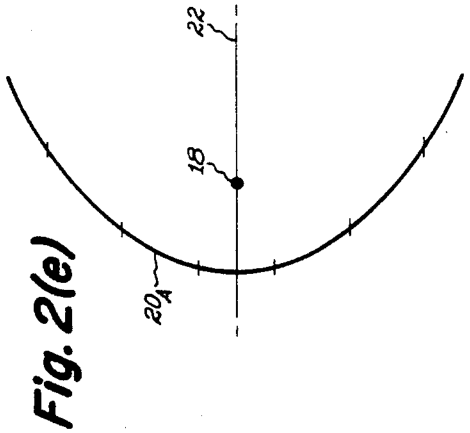
Figure 2F:
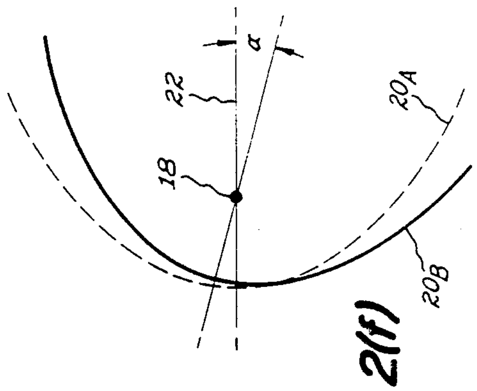

FIG. 1 illustrates a reflector 10 for projecting light from a light source 12 in a predetermined illumination pattern. The reflector 10 comprises bending and spreading facets, to be described in further detail hereinafter, consisting of a plurality of discrete reflective surfaces respectively having right parabolic cylindrical surfaces and simple rotated parabolic surfaces. The right parabolic cylindrical surfaces are of a parabolic shape in the vertical plane and of a circular or linear shape in the horizontal plane. All of the reflective surfaces are coated with a reflective material such as aluminum or silver.

The right parabolic surfaces create a lateral spread of the light developed by the light source 12, whereas the simple rotated parabolic surfaces create a shifting, relative to light source 12, of the light developed by the light source, whereby the right parabolic and simple rotated parabolic surfaces cooperate to develop a compact projected light pattern output of the headlamp so as to serve the highway needs of a motor vehicle in which the reflector is housed. As will be discussed, the shifting of the developed light is created by rotating the surface of the simple parabolic surfaces about the focal point of the parabola.

The reflector 10 shown in FIG. 1 in combination with an optically passive lens (not shown) comprises the lamp envelope or headlamp for the motor vehicle in which it serves. The reflector and the lens may each be formed of a plastic or glass material. The headlamp may incorporate conventional aiming and holding attachment points or keyways with additional bezels or trim fixtures which adapt the contour of the headlamp to that of the front end sheet metal of the vehicle.

The light source 12 of the headlamp shown in FIG. 1 is housed within a glass envelope containing a relatively high pressure fill-gas along with a halogen additive. The glass envelope may be formed of quartz or glass tubing. The glass may be of a low sodium high temperature such as #177 or #180 type glasses available from the Lighting Business Group of Cleveland, Ohio, of the General Electric Company. The liqht source 12 further comprises tungsten filaments 14 and 16 respectively serving as high beam and low beam illumination of the headlamp. For clarity purposes filament 16 is not shown in FIG. 1.

The light source 12 may be of a replaceable type unit such as that described in U.S. patent application Ser. No. 839,769 of Peters et al. filed 3/14/86 and herein incorporated by reference. Further, the light source 12 may be devoid of a glass envelope and comprised of filaments 14 and 16. The light source 12 shown in FIG. 1 preferably has the mid-portion of filament 14 located at the optical center 18 of the reflector.

The bending and spreading facets are shown in FIG. 1, as arranged in a rectangular array or matrix. The elements of the matrix are shown by the use of two subscripts and are arranged into rows and columns with the first subscript indicating row position and the second subscript indicating column position. Some of the bending facets are indicated, in part, with the reference number 20, whereas, some of the spreading facets are indicated, in part, with the reference number 24. The non-facets surfaces, shown in FIG. 1 as located in the central region of reflector 10, are indicated, in part, with the reference number 10. The last facet of each row of the matrix is indicated, in part, with the subscript m, whereas, the last facet of each column of the matrix is indicated, in part, with the subscript n.

The bending and spreading facets are each preferably of a parabolic shape in the vertical plane and operate such that when light emitted from a light source is intercepted by this surface which is preferably a small section of a parabola, the intercepted light is projected from that type of surface. The projected light when falling upon a target plane, such as a roadway, produces an image of light source and also produces an image which is peculiar to the parabolic parameters of the bending and spreading facets along with the spatial relationship of the light source and the bending and spreading facets. The present invention adjusts the location of the desired arrival area, such as the roadway, of the projected source image emitted by the headlamp so as to produce an intended light distribution. The adjustment is accomplished, in part, by the bending facets which have a rotation characteristic chosen to properly reposition the light emitted by the light source. The adjustment is further accomplished by the spreading facets which change the horizontal contour of the reflector so as to laterally spread, but not horizontally spread, the light distribution of the headlamp. The operation of the bending and spreading facets are to be further described hereinafter with regard to FIG. 5.

The bending facets 20 may be first described with regard to FIGS. 2(*a*)–2(*g*). A single bending facet 20 is shown in perspective and side views of FIGS. 2(*a*) and (*b*), respectively, as having parabolical cylindrical surfaces, that is, surfaces of a parabolic shape in the vertical and the horizontal planes. The bending facet 20 is shown in perspective and side views FIGS. 2(*c*) and (*d*), respectively, as being displaced from its original position $20_A$ (shown in phantom in FIG. 2(*c*)) to its final position $20_B$ by means of translation of a parabolic curve along a straight line which may be described with reference to FIGS. 2(*e*), (*f*) and (*g*).

The original parabolic curve $20_A$ is shown in FIG. 2(*e*) relative to the focal point 18 and optical axis 22 of the reflector 10. The curvature $20_A$ of the facet 20 is shown in FIG. 2(*f*) as being rotated about the optical center 18 by a predetermined angle of rotation, in the range of about 0 to about 5 degrees, so as to obtain its final rotated parabolic curvature $20_B$ The facet 20 having the curvature $20_B$ is a section of a parabolic surface of revolution created by rotation about the axis of symmetry that is the optical axis 22. The affixed orientation of a plurality of bending facets 20 having a rotated parabolic curvature $20_B$ and the original parabolic curvature $20_A$ are shown in FIG. 2(*g*).

A perspective view of a portion of the bending facets 20 are illustrated in FIG. 3(*a*) and notated by two subscripts with the first indicating row position in the array of the reflector 10 and the second indicating column position in the array. Each of the bending facets 20 have a height in the range of about 10 mm to 30 mm and a width in the range of about 5 mm to about 50 mm. Each of the bending facets 20 have a curvature, as shown in FIG. 3*b* for a single facet 20, of a standard vertical parabola that may be expressed by the following equation:

$$X^2 = 4fy \quad (1)$$

where f is a parabolic "focal length" having values in the range of about 10 mm to about 50 mm and the value of X may be in the range of about 20 mm to about 200 mm.

A perspective view of a portion of the spreading facets 24 is shown in FIG. 4, and noted by two subscripts with the first indicating row position in the array of the reflector and the second indicating column position in the array. Each of the spreading facets 24 have a height in the range of about 10 mm to about 30 mm and a width in the range of about 5 mm to about 50 mm. Further, each of the spreading facets have a curvature 32 given by the standard vertical parabola that may be expressed by equation (1) and wherein:

f is the parabolic "focal length" having values in the range of about 10 mm to about 50 mm and X has values in the range of about 20 mm to about 200 mm.

With reference to FIG. 4, it should be noted that the curvature, from top to bottom, of all the spreading facets $\mathbf{24}_{11} \ldots \mathbf{24}_{2n}$ is parabolic, whereas, the contour, from left to right, may not be curved, that is, it may be straight so that the spreading facet approaches a parabolic cylinder or at least that the curvature is not parabolically curved.

Figure 5:
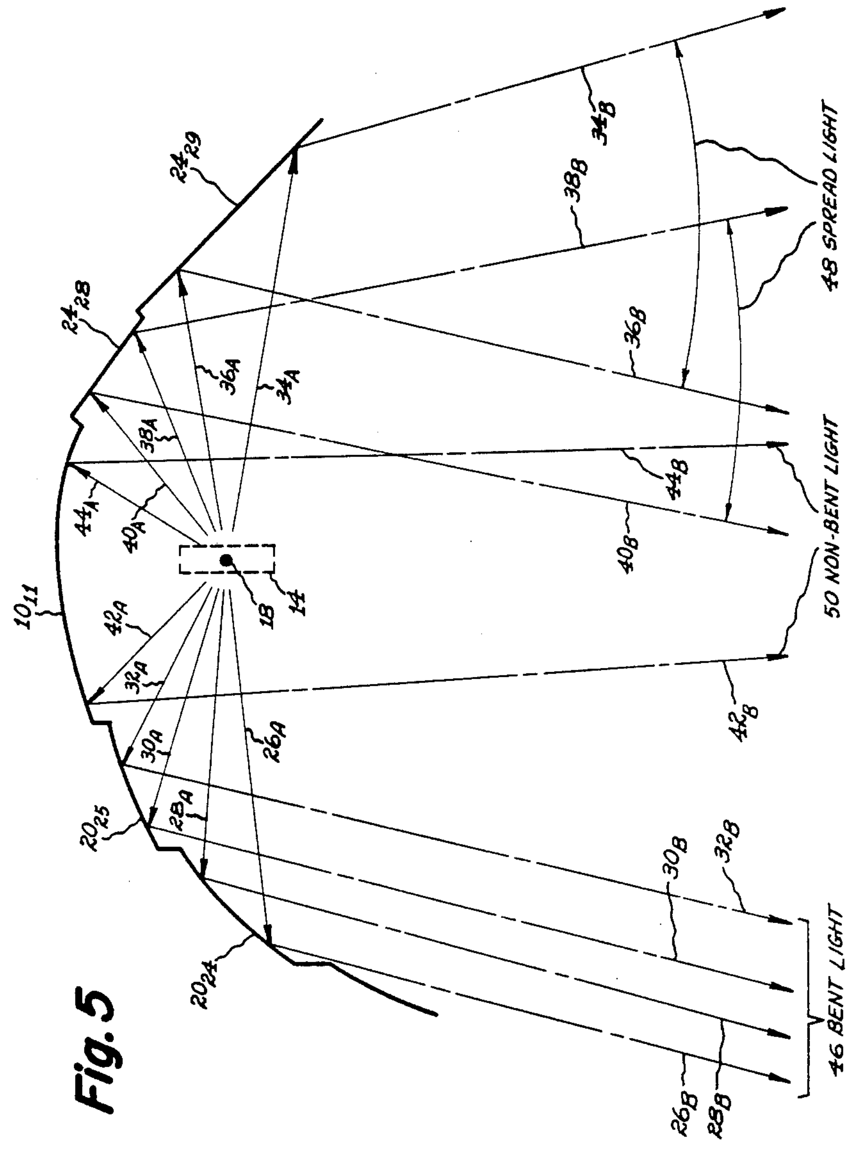
FIG. 5 is a schematic view illustrating the light distribution developed by the bending and spreading facets along with parabolic non-faceted surfaces cooperating so as to provide a compact light illumination pattern output of the headlamp of the present invention.

The operation of the spreading and bending facets of the present invention may be described with reference to FIG. 5 which illustrates the representative light distribution of the light emitted from the filament 14, having its mid-portion approximately located at the optical center 18. The cumulative effect on the light output of the reflector 10 developed by the bending and spreading facets of the present invention along with non-faceted reflective surfaces of the reflector 10 is illustrated in FIG. 5. Bending facets $\mathbf{20}_{24}$, $\mathbf{20}_{25}$, spreading facets $\mathbf{24}_{28}$, $\mathbf{24}_{29}$ along with a portion of the non-faceted parabolic section $\mathbf{10}_{11}$ of the reflector 10, are representatively shown in FIG. 5.

FIG. 5 illustrates that the filament 14 emits light rays $\mathbf{26}_A \ldots \mathbf{44}_A$ some of which have light paths which are bent, some of which have light paths which are spread and some of which have light paths which are redirected in a non-alterated manner. The light rays $\mathbf{26}_A$ and $\mathbf{28}_A$, $\mathbf{30}_A$ and $\mathbf{32}_A$ are respectively intercepted by bending facets $\mathbf{20}_{24}$ and $\mathbf{20}_{25}$ so as to bend and redirect, in a manner parallel to each other, into light rays $\mathbf{26}_B$, $\mathbf{28}_B$, $\mathbf{30}_B$ and $\mathbf{32}_B$ which comprise composite bent light 46. Further, filament 14 emits light rays $\mathbf{34}_A$, and $\mathbf{36}_A$, and $\mathbf{38}_A$ and $\mathbf{40}_A$ which are respectively intercepted by spreading facets $\mathbf{24}_{29}$, $\mathbf{24}_{28}$ and redirected, in a non-parallel manner to one another and also at a predetermined angle to one another by an amount determined by the length and shape of the spreading facet, and shape (i.e. linear, circular, etc.) of the facet in the plan view into light rays $\mathbf{34}_B$, $\mathbf{36}_B$, $\mathbf{38}_B$ and $\mathbf{40}_B$ which comprise composite spread light 48. Finally, the light source 12 emits light rays $\mathbf{42}_A$ and $\mathbf{44}_A$ which are intercepted by the parabolic section $\mathbf{10}_{11}$ and redirected into composite non-bent or direct light 50 in a manner wherein the angle of refraction of the reflected rags equals the angle of incidence of the intercepted rays.

The spread light composite 48 creates a lateral divergence or spreading of the light developed by the light source 12, whereas, the bent light composite 46 forms the high intensity portion of the light developed by light source 12. The composites 46 and 48 along with the non-bent light composite 50 all cooperate with each other to provide an output beam which is compact in the vertical direction but spread out to meet the needs of the automotive headlamp and to meet appropriate headlamp photometric standards.

The cumulative effect of the bending and spreading facets of the present invention along with the non-faceted portion of the reflector 10 is to provide a compact vertical light distribution having a typical lumen output which meets the standard requirements of the automotive headlamp along with a standard beam pattern commonly specified as a beam size of approximately ±15° right and left and 4° down and 2° up all measured relative to the nominal headlamp centerline.

The headlamp of the present invention having all of the desired optics comprising the bending and spreading facets placed entirely on the reflector 10 eliminates the need for the associated lens of the headlamp to provide any optical function. Thus, the lens related to the present invention is essentially optically passive or neutral. Further, the bending and spreading facets of the present invention arranged in a matrix array may be preselected to accommodate the optical requirements of a variety of automotive styles previously discussed in the "Background" section. Still further, as previously discussed in the "Background" section, the headlamp of the present invention eliminates the lens error contributions so as to provide a more accurate output beam pattern.

It should now be appreciated that the practice of the present invention provides for a motor vehicle headlamp wherein the desired optics are entirely placed onto the reflective surfaces of the reflector. The headlamp has an optically passive lens and developes a desired beam pattern with the required illumination for meeting the needs of various motor vehicles.

What I claim is:

1. A reflector for projecting light from a light source in a desired illumination pattern, said reflector comprising;

a plurality of discrete reflective surfaces located relative to the light source when such is positioned approximately at the optical center of said reflector and having right parabolic cylindrical surfaces and simple parabolic surfaces, at least some of which simple parabolic surfaces being rotated in a direction with respect to the light source, said riqht parabolic cylindrical surfaces creating a lateral spread of light developed by said light source, whereas, said simple rotated parabolic surfaces, shifted relative to the light source, create a shifting of the light developed by the light source, whereby, said right parabolic and simple rotated surfaces cooperate to develop a compact projected light pattern.

2. A reflector in accordance with claim 1 wherein said right parabolic cylindrical surfaces and said rotated parabolic surfaces each have a height in the range of about 10 mm to about 30 mm and each have a width in the range of about 5 mm to about 50 mm.

3. A reflector in accordance with claim 1 wherein said right parabolic cylindrical surfaces and said rotated parabolic surfaces each have a parabolic curvature expressed as;

$$X^2 = 4fy$$

where f is a parabolic "focal length" having values in the range of about 10 mm to about 50 mm and X has values in the range of about 20 mm to about 200 mm.

4. A reflector in accordance with claim 1 wherein said simple parabolic surfaces are rotated from said optical center by an angle in the range of about 0 degrees to about 5 degrees.

5. A reflector in accordance with claim 1 wherein said simple parabolic surfaces have parabolic surfaces in the vertical and horizontal planes.

6. A reflector in accordance with claim 1 wherein said simple parabolic surfaces serve as bending facets of said reflector.

7. A reflector in accordance with claim 1 wherein said parabolic cylindrical surfaces are parabolic in the vertical plane and approach a parabolic cylinder in the horizontal plane.

8. A reflector in accordance with claim 1 wherein said parabolic cylindrical surfaces serve as spreading facets of said reflector.

9. The motor vehicle lamp having optics placed entirely on a reflective surfaces of a reflector for projecting a light beam in a predetermined illumination pattern comprising;

a lens cooperating with the reflector to form a lamp envelope;

a light source predeterminedly positioned approximately at optical center of the reflector; and said reflector being adapted for mounting on a motor vehicle and comprising a plurality of discrete reflective surfaces located relative to the light source and having right parabolic cylindrical surfaces and simple parabolic surfaces, at least some of which simple parabolic surfaces are rotated in a direction with respect to the light source, said parabolic surfaces creating a lateral spread of a light developed by said light source, whereas, said simple rotated parabolic surfaces, shifted relative to the light source, create a shifting of the light developed by said light source, whereby, said right parabolic and simple rotated surfaces cooperate to develop a compact projected light pattern.

10. A motor vehicle lamp in accordance with claim 9 wherein said right parabolic cylindrical surfaces and said rotated parabolic surfaces each have a height in the range of about 10 mm to about 30 mm and each have a width in the range of about 5 mm to about 50 mm.

11. A motor vehicle lamp in accordance with claim 9 wherein said right parabolic cylindrical surfaces and said rotated parabolic surfaces each have a parabolic curvature expressed as;

$$X^2=4fy$$

where f is a parabolic "focal length" having values in the range of about 10 mm to about 50 mm and X has values in the range of about 20 mm to about 200 mm.

12. A motor vehicle lamp in accordance with claim 9 wherein said simple parabolic surfaces are rotated from said optical center by an angle in the range of about 0 degrees to about 5 degrees.

13. A motor vehicle lamp in accordance with claim 9 wherein said simple parabolic surfaces have parabolic surfaces in the vertical and horizontal planes.

14. A motor vehicle lamp in accordance with claim 9 wherein said simple parabolic surfaces serve as bending facets of said reflector.

15. A motor vehicle lamp in accordance with claim 9 wherein said parabolic cylindrical surfaces are parabolic in the vertical plane and approach a parabolic cylinder in the horizontal plane.

16. A motor vehicle lamp in accordance with claim 9 wherein said parabolic cylindrical surfaces serve as spreading facets of said reflector.

* * * * *